United States Patent
Ohmori et al.

(10) Patent No.: US 6,621,925 B1
(45) Date of Patent: Sep. 16, 2003

(54) IMAGE PROCESSING APPARATUS AND METHOD AND INFORMATION PROVIDING MEDIUM

(75) Inventors: Mutsuhiro Ohmori, Kanagawa (JP); Hugo Habets, Gemert (NL)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/340,420

(22) Filed: Jun. 28, 1999

(30) Foreign Application Priority Data

Jun. 29, 1998 (JP) .......................................... 10-181873

(51) Int. Cl.[7] .................................................. G06K 9/00
(52) U.S. Cl. ........................................ 382/167; 358/518
(58) Field of Search ................................. 382/167, 162, 382/233, 276, 285, 154, 292, 300; 358/519, 518, 523, 520, 506, 531; 345/430, 509, 521, 515, 582

(56) References Cited

U.S. PATENT DOCUMENTS

| 6,014,457 A | * | 1/2000 | Kubo et al. ................. 382/167 |
| 6,055,074 A | * | 4/2000 | Himoto ...................... 358/518 |
| 6,111,584 A | * | 8/2000 | Murphy ...................... 345/430 |
| 6,400,364 B1 | * | 6/2002 | Akisada et al. ............. 345/427 |

* cited by examiner

*Primary Examiner*—Jayanti K. Patel
*Assistant Examiner*—Seyed Azarian
(74) *Attorney, Agent, or Firm*—Fulwider Patton Lee & Utecht, LLP

(57) ABSTRACT

Instead of tracing using first rays of the ray tracing method, an object is divided into a plurality of triangles, each triangle is projected onto a screen, and data on a three-dimensional coordinate space are converted to data on a screen coordinate system. Pixel data inside a triangle are generated by interpolation based on data of the three vertices of the triangle on the screen coordinate system. Pixel data are corrected by performing a tracing operation using second rays on the pixel data generated by the interpolation.

51 Claims, 16 Drawing Sheets

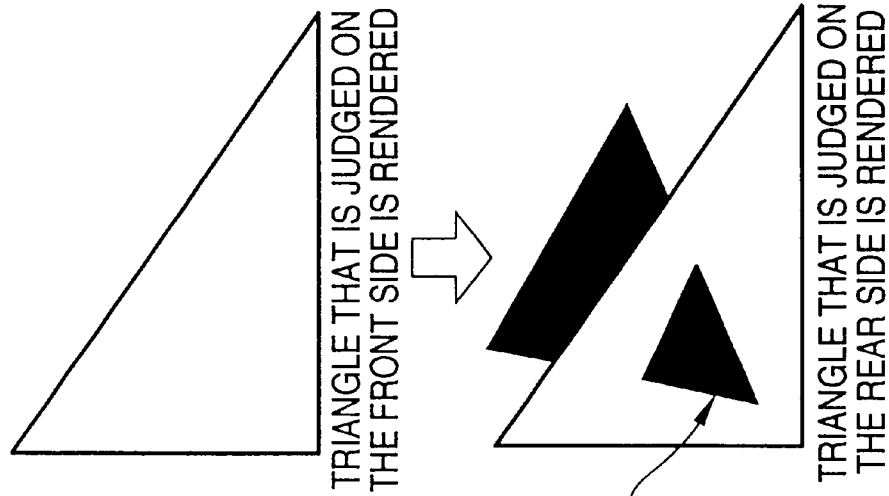
FIG. 7 (B)
FIG. 7 (C)
TRIANGLE THAT IS JUDGED ON THE FRONT SIDE IS RENDERED
TRIANGLE THAT IS JUDGED ON THE REAR SIDE IS RENDERED
THIS PORTION IS RENDERED TWICE
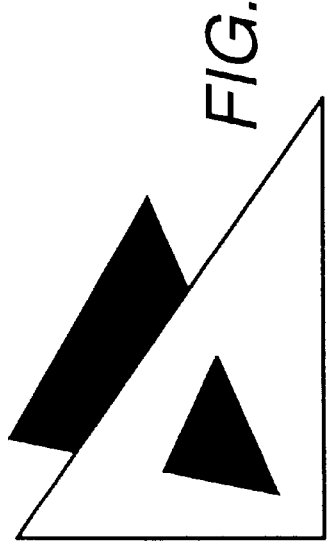
FIG. 7 (A)

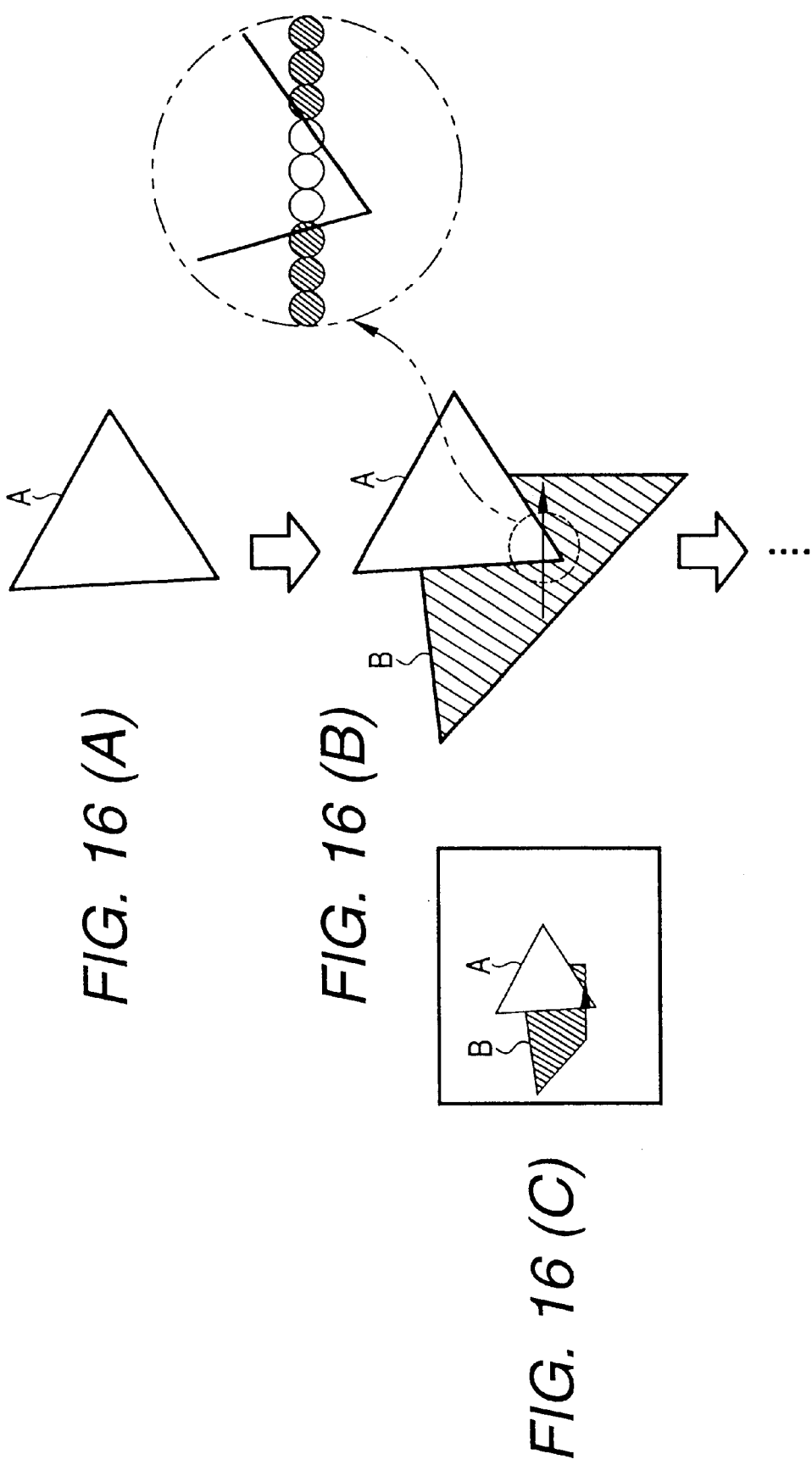

IMAGE PROCESSING APPARATUS AND METHOD AND INFORMATION PROVIDING MEDIUM

BACKGROUND OF THE INVENTION

1. Field of the Invention

The present invention relates to an image processing apparatus and method and an information providing medium. In particular, the invention relates to an image processing apparatus and method and an information providing medium which can generate image data more quickly according to a ray tracing method.

2. Description of the Related Art

FIG. 1 illustrates the principle of a conventional ray tracing method. As shown in FIG. 1, in generating data of a target pixel at a prescribed position on a screen 52, a ray (first ray) that goes from an eye point 51 at a preset position to the target pixel on the screen 52 is assumed and the first ray is caused to strike a prescribed object (object 53 in this example) that is located in a three-dimensional coordinate space. An image portion of the point on the object 53 at which the first ray strikes should be rendered at the target pixel on the screen 52.

Where a ray emitted from a light source 55 is reflected by an object 54 and shines on the above point on the object 53, the image portion of the point on the object 53 at which the first ray strikes is also influenced by this ray. Therefore, by retracing this ray from the above point on the object 53 to the light source 55, a second ray is assumed that goes from the object 53 to the object 54 and a third ray is assumed that goes from the object 54 to the light source 55. The image portion of the point on the object 53 that is struck by the first ray is corrected by calculating influences of the second and third rays. As a result, the target pixel on the screen 52 comes to reflect a correction result.

In CAD, for example, a plurality of objects are generated and disposed in a prescribed three-dimensional coordinate space and an image of those three-dimensional objects as viewed from a prescribed eye point can be calculated as an image on the screen 52 and then displayed in the above manner.

However, the above method according to ray tracing has a problem that since it is necessary to judge what objects rays at each stage strike, the amount of calculation is enormous and it is more difficult to increase the processing speed than in the polygon rendering method etc.

SUMMARY OF THE INVENTION

The present invention has been made in the above circumstances and an object of the invention is therefore to make it possible to generate image data more quickly.

The invention provides an image processing apparatus which converts objects in a three-dimensional coordinate space to image data on a screen, comprising projecting means for generating image data by projecting data representing surfaces of the object onto a screen coordinate system; interpolating means for generating pixel data inside the surfaces on the screen coordinate system by interpolation based on the projected image data on the screen coordinate system; and correcting means for generating a ray for a point on the object that corresponds to the pixel data generated by the interpolating means, and for generating correction information for correcting a value of the pixel data on the screen coordinate system based on a judgment of intersection of the ray with another objects.

According to another aspect of the invention, there is provided an image processing method for converting objects in a three-dimensional coordinate space to image data on a screen, comprising a projecting step of generating image data by projecting data representing surfaces of the objects onto a screen coordinate system; an interpolating step of generating pixel data inside the surfaces on the screen coordinate system by interpolation based on the projected image data on the screen coordinate system; and a correcting step of generating a ray for a point on the object that corresponds to the pixel data generated by the interpolating step, and for generating correction information for correcting a value of the pixel data on the screen coordinate system based on a judgment of intersection of the ray with another objects.

According to a further aspect of the invention, there is provided an information providing medium for providing a program that causes an image processing apparatus to execute a process of converting objects in a three-dimensional coordinate space to image data on a screen, the process comprising a projecting step of generating image data by projecting data representing surfaces of the objects onto a screen coordinate system; an interpolating step of generating pixel data inside the surfaces on the screen coordinate system by interpolation based on the projected image data on the screen coordinate system; and a correcting step of generating a ray for a point on the object that corresponds to the pixel data generated by the interpolating step, and for generating correction information for correcting a value of the pixel data on the screen coordinate system based on a judgment of intersection of the ray with another objects.

BRIEF DESCRIPTION OF THE DRAWINGS

FIGS. 7(A)–7(C) illustrate an operation of rendering objects that intersect each other;

FIG. 16 illustrates an operation using a Z buffer.

DETAILED DESCRIPTION OF THE PREFERRED EMBODIMENTS

Figure 1:
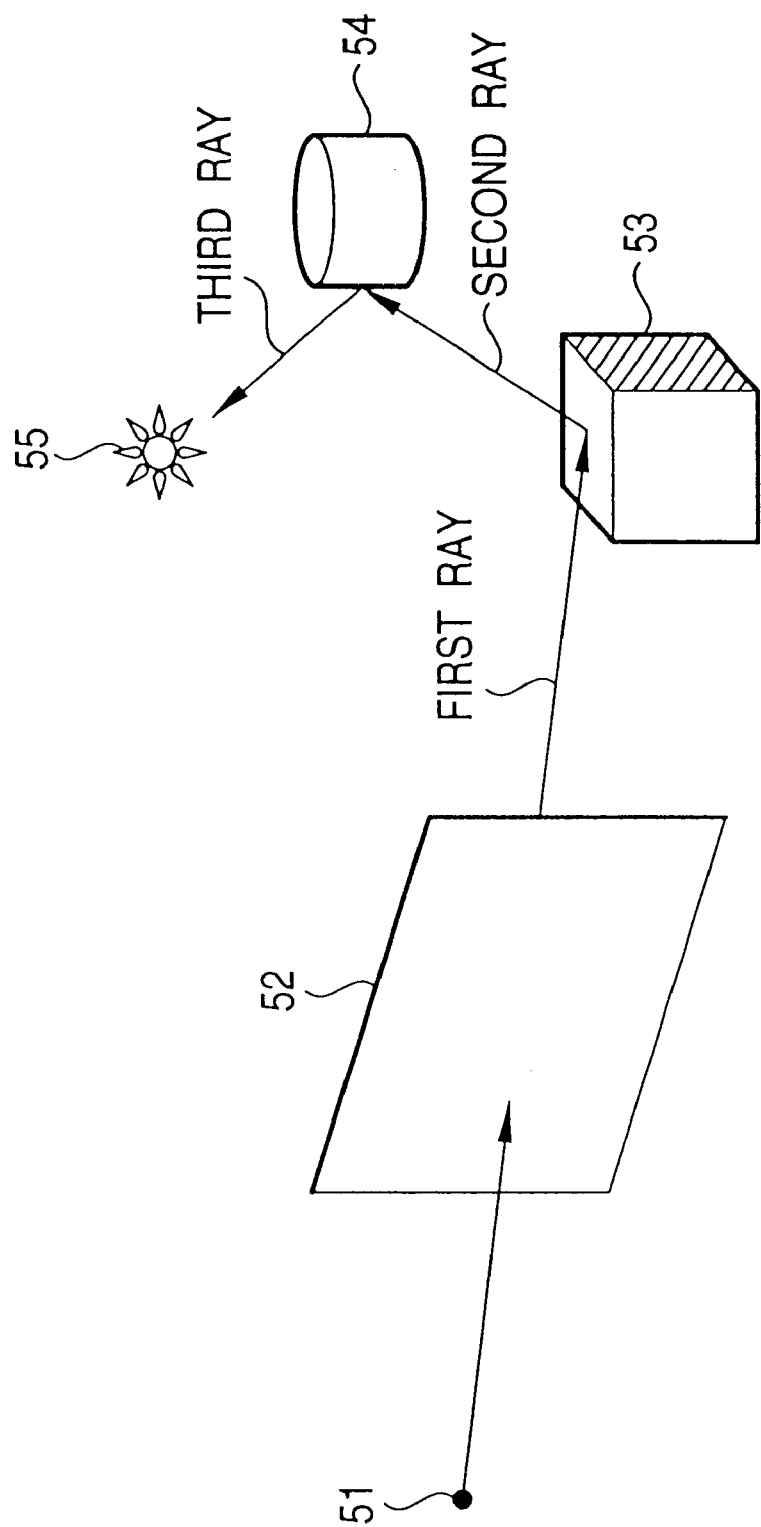
FIG. 1 illustrates a conventional ray tracing method.
Figure 2:
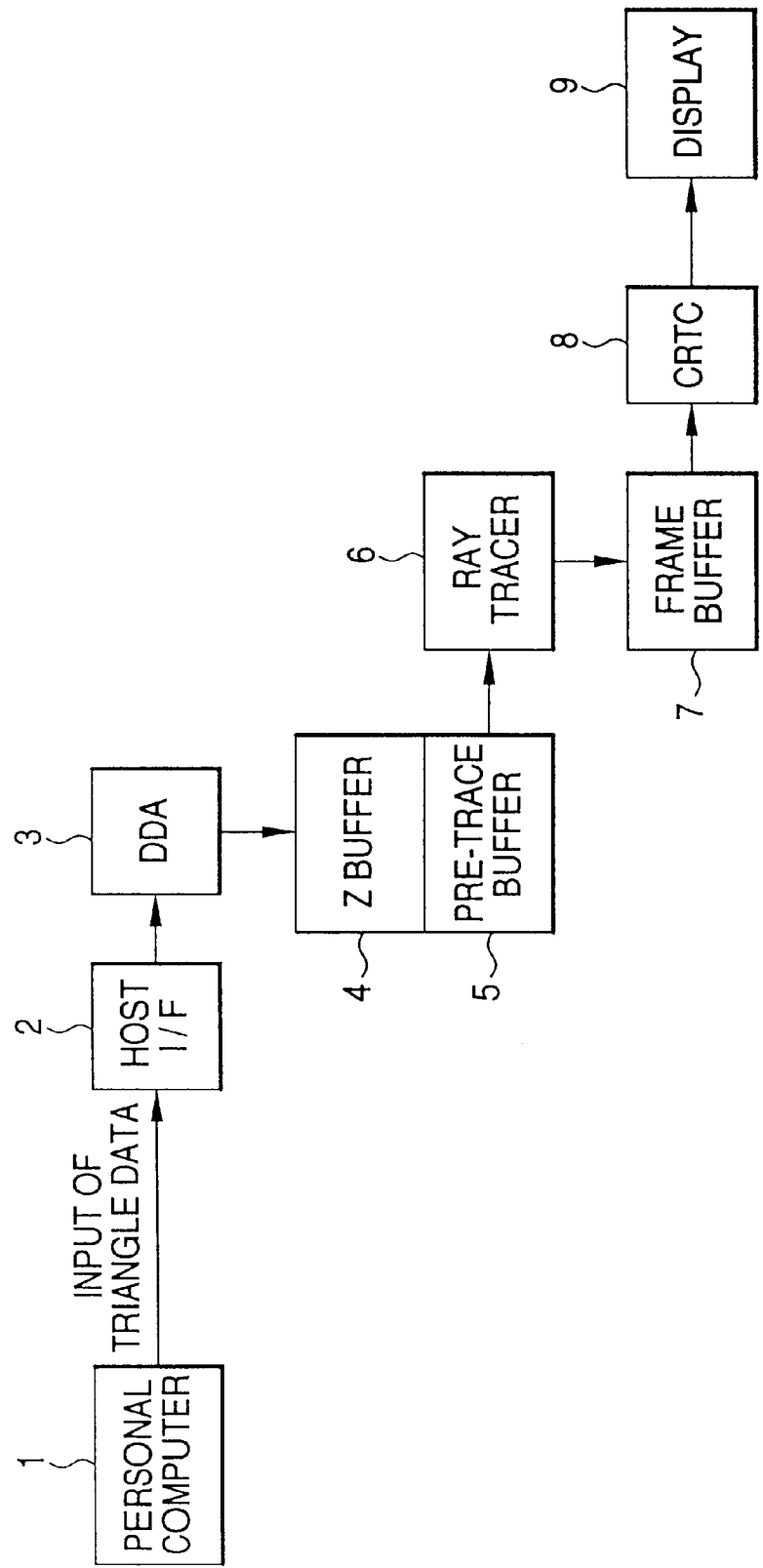
FIG. 2 is a block diagram showing the configuration of an image processing apparatus according to a first embodiment of the invention.

FIG. 2 shows the configuration of an image processing system according to a first embodiment of the present invention. A personal computer 1 as a host computer divides each surface of an object in a three-dimensional coordinate space into a plurality of triangles and generates image data by projecting the respective triangles onto a prescribed screen coordinate system. The personal computer 1 supplies the image data on the screen coordinate system and image data relating to a light source to a DDA (digital differential analyzer) 3 via a host interface 2. For example, data such as a normal vector, a surface diffusion coefficient, a surface reflection coefficient, a refraction coefficient, transparency, a surface color (R, G, B) of a surface that is defined on the three vertices (coordinates (x, y, z)) of each triangle and information such as coordinates (x, y, z), brightness and a color (R, G, B), and a type (point, parallel, spot diameter) of the light source are input to the DDA 3.

Based on the apex coordinates values of each triangle that are input from the personal computer 1 via the host interface 2, the DDA 3 generates pixel data inside each triangle by linear interpolation. The generated pixel data are input to a Z buffer 4, where they are subjected to a sorting operation that is performed based on coordinates in the depth direction (z-axis direction). That is, pixel data closer to the eye point are selected and only closest pixel data are supplied to a pre-trace buffer 5 and stored there.

The ray tracer 6 corrects the pixel data stored in the pre-trace buffer 5 by performing a ray tracing operation for the second and following rays on the pixel data stored in the pre-trace buffer 5, and outputs corrected pixel data to the frame buffer 7 and renders those data there. The pixel data rendered in the frame buffer 7 are read out by a CRT controller (CRTC) 8 when necessary and output to a display 9 and displayed thereon.

Figure 3:
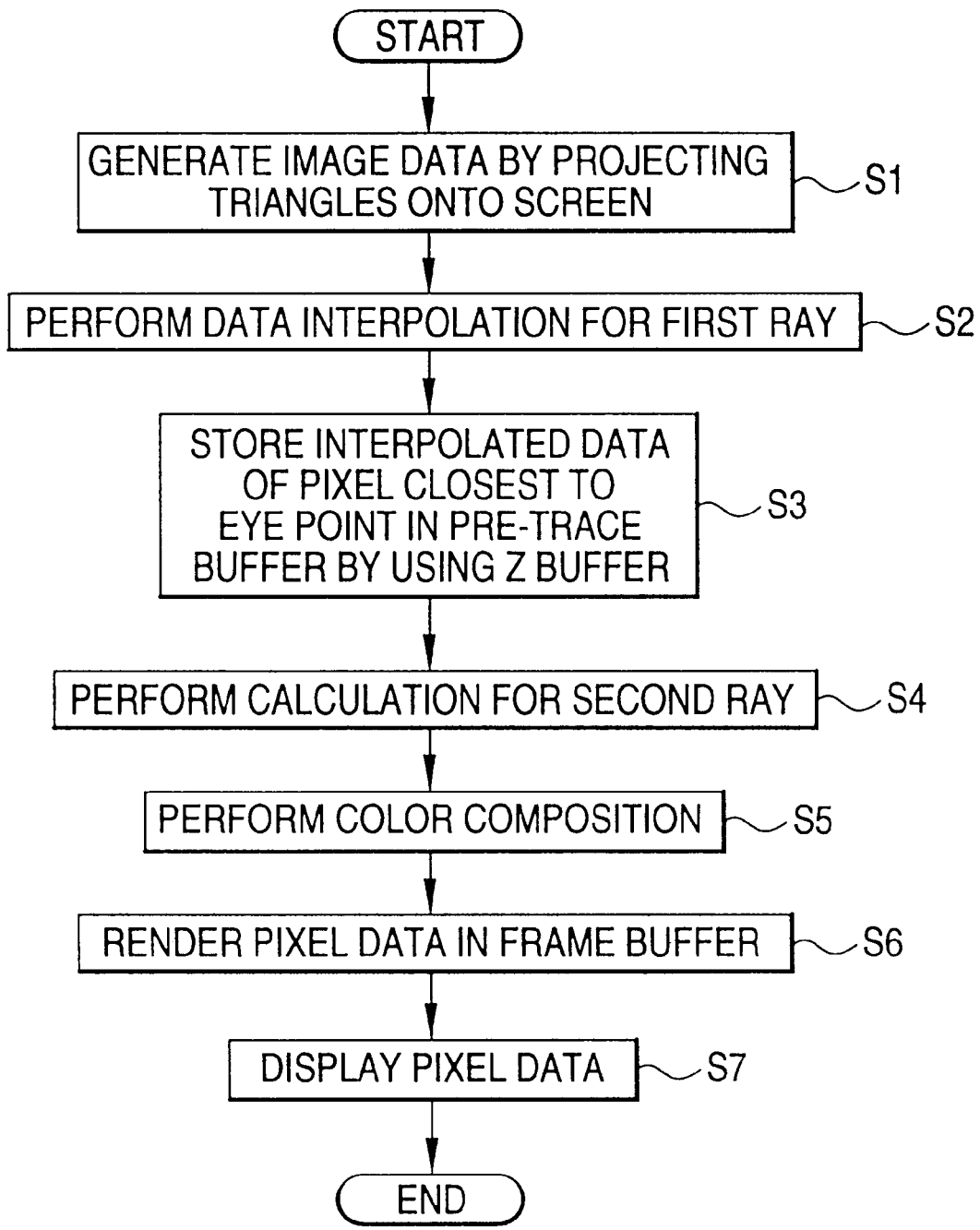
FIG. 3 is a flowchart showing a process to be executed by the image processing apparatus of FIG. 2.
Figure 4:
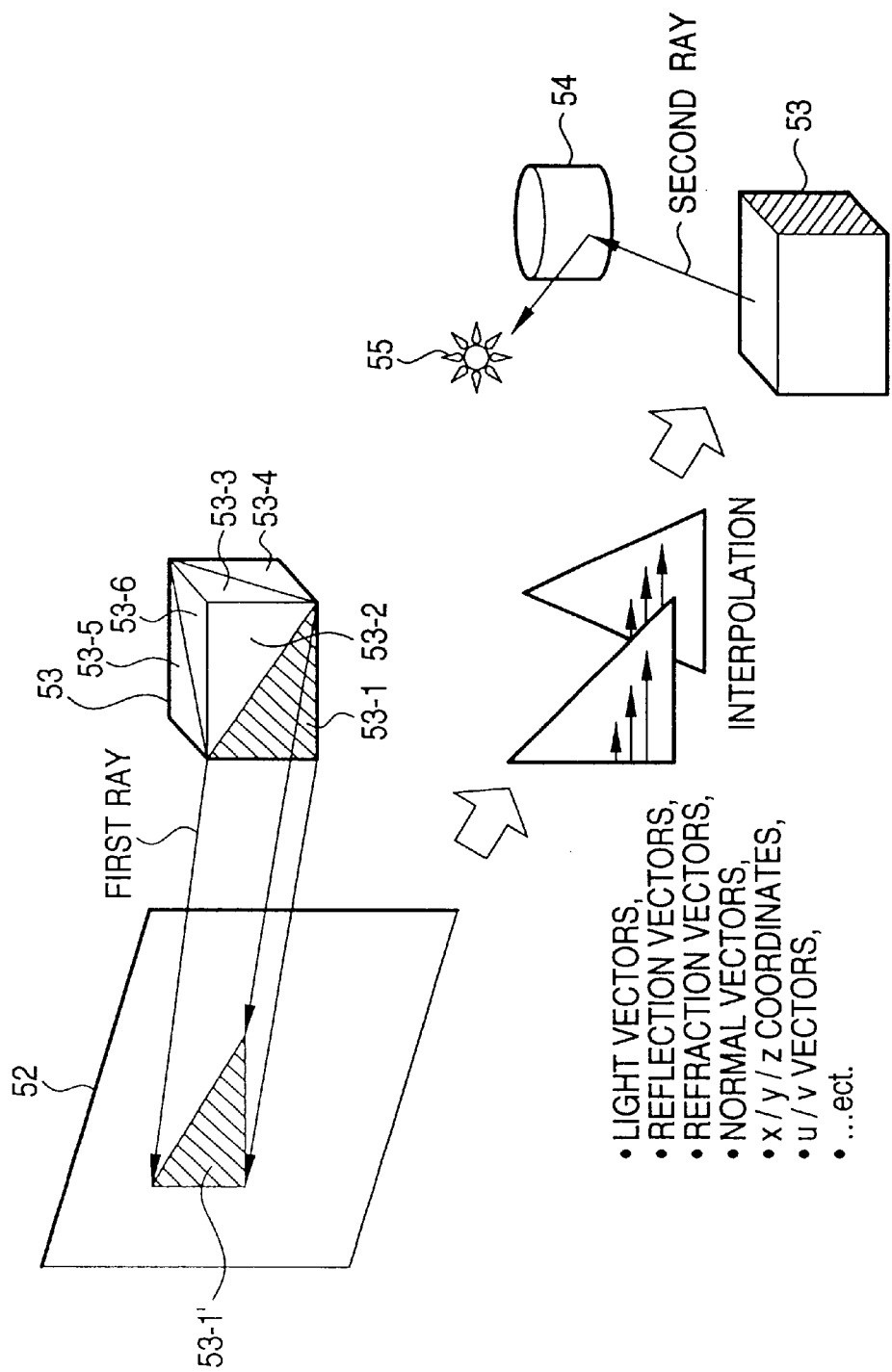
FIG. 4 illustrates the process of FIG. 2.

Next, a process to be executed by the image processing apparatus of FIG. 2 will be described with reference to a flowchart of FIG. 3. First, at step S1, the personal computer 1 divides an object in a three-dimensional coordinate space into a plurality of triangles and generates image data by projecting the triangles onto a prescribed screen. Specifically, as shown in FIG. 4, an object 53 is divided into a plurality of triangles 53-i (i=1, 2, 3, . . . ). Image data is generated by projecting the triangles 53-i onto a screen 52. FIG. 4 shows how a triangle 53-1 of the object 53 is projected onto a screen 52 to form a triangle 53-1'.

That is, in this embodiment, tracing of first rays in the ray tracing method is omitted and the above projection operation is performed instead. As a result, the amount of calculation for judging what objects first rays strike can be reduced to about ¹⁄₁₀₀ of that of the conventional case.

At step S2, the DDA 3 performs an operation of linearly interpolating pixel data inside the triangle based on the coordinates of the three vertices of the triangle that are supplied from the personal computer 1. At step S3, the DDA 3 stores the z-coordinates of pixel data obtained by the interpolation calculations in the Z buffer 4. Utilizing the z-coordinate data, the DDA3 stores only pixel data closest to the eye point in the pre-trace buffer 5. With the above operations, the same image as would be obtained by first ray tracing if it were performed is obtained.

When image data of one picture of the screen 52 has been stored in the pre-trace buffer 5 in the above manner, the process goes to step S4. At step S4, the ray tracer 6 applies a second ray to each object based on the conditions relating to the first ray and determines colors due to ambient light. At step S5, corresponding pixel data is corrected by those colors. An operation for a second ray is omitted if, for example, the object does not reflect light.

At step S5, when the colors due to ambient light are determined by using second rays, those colors, texture, and the color of the object are blended by the ray tracer 6 to obtain a color at the position of the object where the first ray strikes. At step S6, the ray tracer 6 renders pixel data of the finally determined color at the position of the corresponding pixel in the frame buffer 7.

At step S7, the CRTC 8 reads out the pixel data that have been rendered in the frame buffer 7, converts those to a display signal, and outputs it to the display 9 and displays it thereon.

FIG. 4 schematically illustrates the above process. Light vectors, reflection vectors, refraction vectors, normal vectors, (x, y, z) coordinates, u and v vectors of inside pixels that are determined on the coordinates of the vertices of the triangle that is projected on the screen 52 are generated.

After image data have been generated by the above operations that replace the first ray tracing operation, tracing operations for second and following rays are performed.

In the embodiment of FIG. 2, only image data that are closest to the eye point are stored in the pre-trace buffer 5. A second embodiment is directed to a case where such a pre-trace buffer 5 is not provided.

Figure 5:
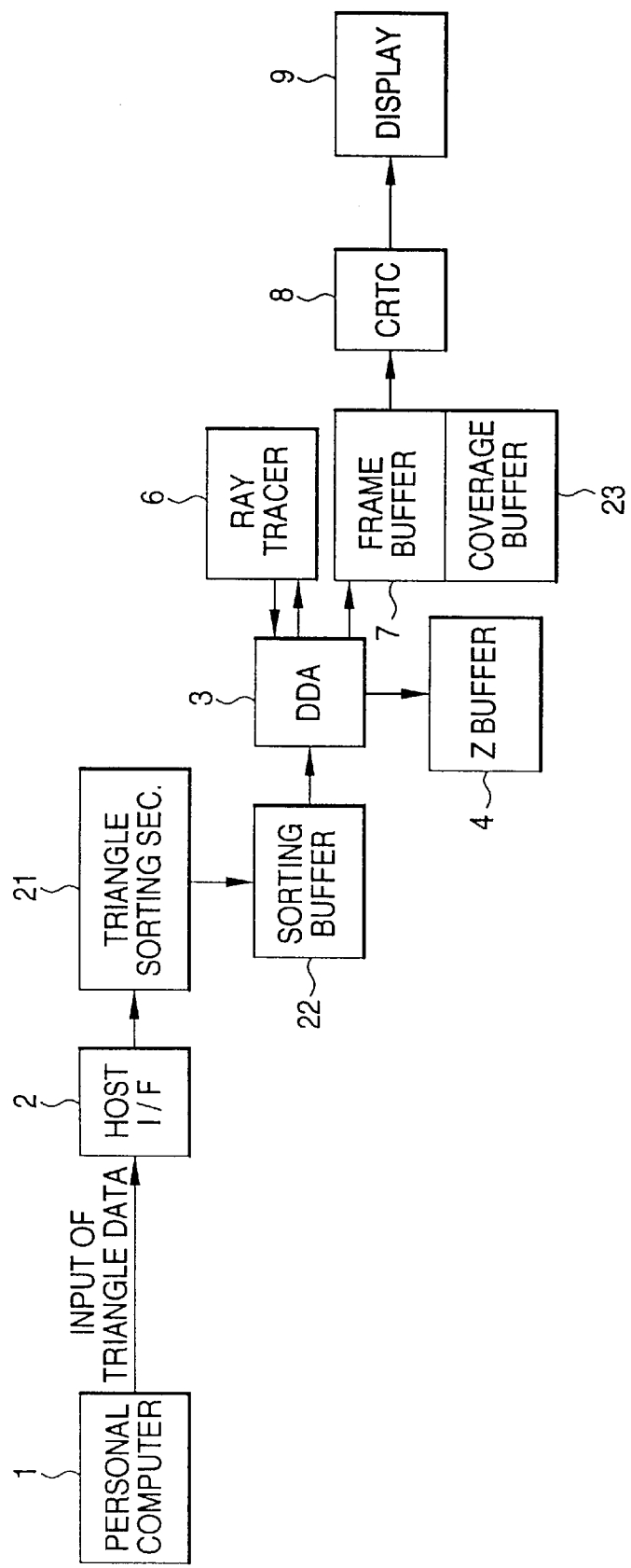
FIG. 5 is a block diagram showing the configuration of an image processing apparatus according to a second embodiment of the invention.

In a configuration according to the second embodiment of FIG. 5, a triangle sorting section 21 and a sorting buffer 22 are provided between the host interface 2 and the DDA 3. Although the DDA 3 performs an interpolation operation by utilizing the Z-buffer 4, the pre-trace buffer 5 is omitted. Connected to the DDA 3, the ray tracer 6 exchanges data with the DDA 3. Further, the DDA 3 outputs image data to the frame buffer 7 and stores the image data there.

Further, a pixel coverage buffer 23 is provided in this embodiment. A prescribed weighting operation is performed in accordance with values stored in the pixel coverage buffer 23 and resulting pixel data are rendered in the frame buffer 7. The remaining part of the configuration is the same as in FIG. 2.

Figure 6:
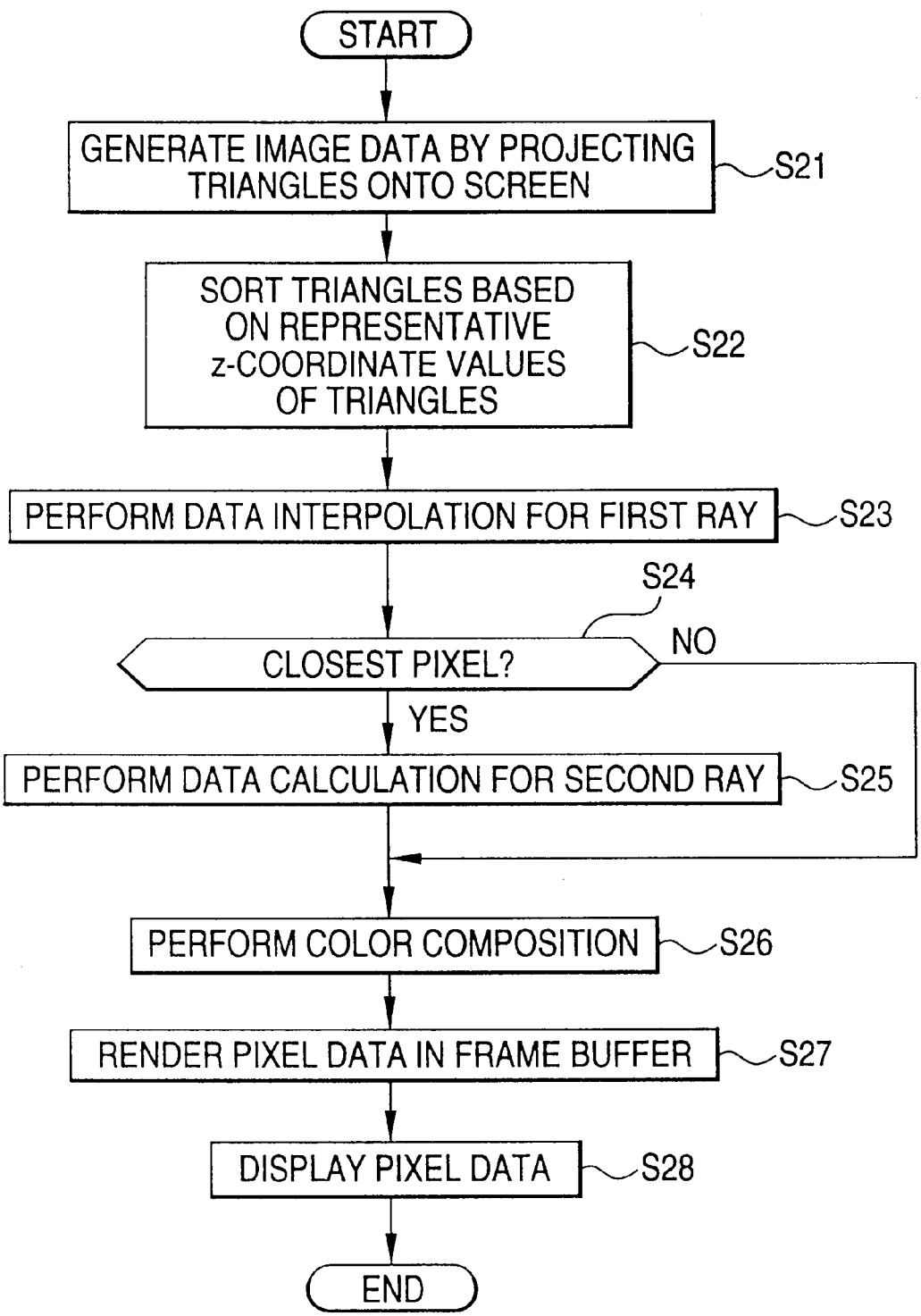
FIG. 6 is a flowchart showing a process to be executed by the image processing apparatus of FIG. 5.

Next, a process to be executed by the image processing apparatus of FIG. 5 will be described with reference to a flowchart of FIG. 6. First, at step S21, the personal computer 1 generates image data by projecting triangles onto a screen. This step is the same as step S1 shown in FIG. 3. When receiving pixel data on a screen coordinate system from the personal computer 1 via the host interface 2, the triangle sorting section 21 determines representative z-coordinate values of the respective triangles and sorts the triangles based on the representative values. A sorting result is stored in the sorting buffer 22.

For example, the representative z-coordinate value of each triangle may be the average of the z-coordinates of the three vertices or the z-coordinate of arbitrary one of the three vertices.

Then, at step S23, the DDA 3 generates, by linear interpolation, pixel data inside each triangle that is input from the sorting buffer 22. This step is the same as step S2 shown in FIG. 3.

The DDA 3 performs interpolation calculations on triangles in order of their closeness to the eye point, and turns on/off a second ray calculation for an interpolation operation of each pixel by using the Z-buffer 4.

Specifically, at step S24, the DDA 3 judges whether the target pixel is closest to the eye point. If it is the closest pixel, the process goes to step S25, where the pixel data is output to the ray tracer 6 to have it calculate data of a second ray. The ray tracer 6 applies a second ray to an object based on the conditions relating to the first ray that are input from the DDA 3, determines a color due to ambient light, and outputs data of the color to the DDA 3.

If it is judged at step S24 that the target pixel is not closest to the eye point, the DDA 3 omits execution of step S25 (i.e., a second ray operation). If the magnitude of a reflection vector or a refraction vector of the pixel determined by the interpolation calculation is smaller than a preset reference value, the DDA 3 can omit a second ray calculation (i.e., skip step S25). For example, a second ray operation is omitted for an object that does not reflect light.

The DDA 3 calculates information for second rays inside a triangle (i.e., a surface-like object) by performing interpolation calculations based on information for second rays of the vertices of the triangle. The amount of second ray calculation can be reduced by omitting the interpolation calculation if it is judged that no consideration needs to be given to a second ray during the interpolation calculation.

If, as described above, triangles are sorted in order of their depth, pixels of the triangles are interpolated in order of closeness of the triangles to the eye point, and second ray calculations are controlled for each interpolation calculation by using the Z buffer 4, the rendering proceeds in the following manner. Now assume an example shown in FIG. 7(A) in which a white triangle and a black triangle intersect each other. Since triangles have been sorted based on representative z-coordinate values of the three vertices, the white triangle that is judged closer to the eye point based on the representative values is rendered first as shown in FIG. 7(B). The black triangle that is judged farther based on the representative values is then rendered as shown in FIG. 7(C). As for the portion of the black triangle that is to be rendered inside the white triangle, pixels of the white triangle are temporarily rendered there and then pixels of the black triangle are again rendered there (overwriting) because that portion of the black triangle is closer to the eye point than the white triangle. Although rendering is performed doubly and the processing speed is lowered accordingly, this is not very problematic because the possibility of occurrence of such a relationship between triangles (i.e., a judgment result based on representative z-coordinate values is opposite to that based on individual z-coordinate values) is low.

Where the transparency of objects is greater than a preset reference value (i.e., the objects are transparent), the DDA 3 continues to perform second ray operations until a second ray strikes an object whose transparency is smaller than the reference value (i.e., the object is not transparent). Although this type of operation lowers the rendering speed, reflection rays can be dealt with in the same manner as first rays and hence transparent objects can be rendered in complete form. When the ratio of transparent objects to all objects is relatively small, the overall process speed does not decrease to a large extent even if complete calculations are performed only for the transparent objects.

When a triangle closer to the eye point has already been rendered, the DDA 3 may skip interpolation operations and ray tracing operations for second and following rays for pixels that are irrelevant to actual rendering. Where this type of skipping is performed, a variation (per unit) used for interpolation calculations multiplied by the number of pixels skipped can be set as a new value of an interpolation variable. Coordinate values after skipping can be determined from a value obtained by adding the number of pixels skipped to an x-coordinate before the skipping.

The amount of overall calculation can be reduced by omitting unnecessary calculations for second and following rays in the above manner.

If it is found that a triangle that is closer to the eye point has already been rendered by checking the pixels of each triangle to the last pixel in its span (i.e., the range from one end of the triangle in the horizontal direction to the other end), subsequent operations may be omitted at the time point when such a check result is obtained.

When skipping can be made to the end of the span, operations for the span can be finished without multiplying the variation by the number of pixels skipped. Many of cases where a portion located somewhere in the span is covered with another object are such that the remaining portion to the end of the span is also covered with the object, in which case it is not necessary to actually multiply the variation by the number of pixels skipped. In this case, the amount of interpolation calculation can greatly be reduced.

When the ray tracer 6 performs a shadow generating operation or a second ray calculation for a reflection ray or a refraction ray, it performs, for the head pixel of the span, a judgment of intersection with objects that a ray is expected to strike at a certain level of probability according to, for example, the bounding box method or the Octree method. However, for the second and following pixels, first a judgment of whether a ray strikes the object with which a ray strike was found for the immediately preceding pixel is performed. If the judgment result is "strike," no judgment of whether a ray strikes other objects is performed.

Figure 8:
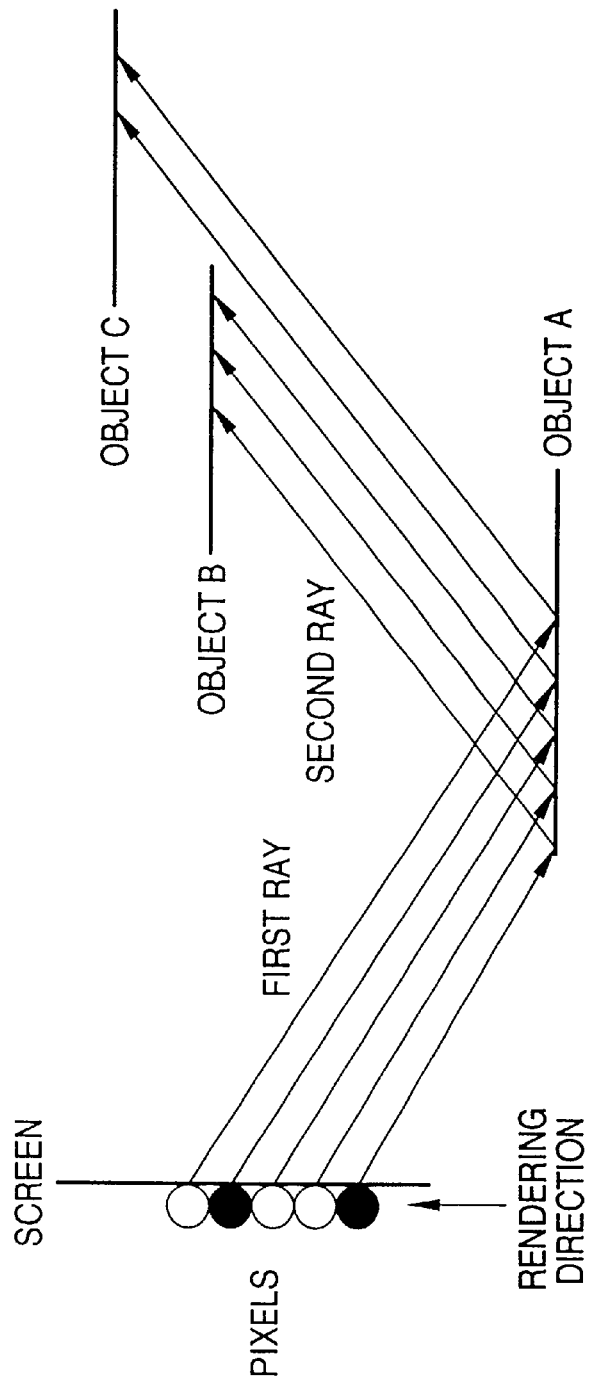
FIG. 8 illustrates a strike judgment.

That is, as shown in FIG. 8, when a ray originating from a certain pixel in a prescribed span strikes an object, it is highly possible that a ray originating from the adjacent pixel also strikes the same object.

In the example of FIG. 8, for the black pixel that is lowest in FIG. 8, since it is the first pixel, a strike judgment is performed for all objects that are expected to be relevant. However, for the two white pixels immediately above the lowest black pixel, a ray strikes the same objects (i.e., object A and object B) with which ray-strikes were found for the immediately preceding pixel. Therefore, no judgment of whether a ray strikes other objects is performed for rays originating from those two pixels.

In contrast, a ray originating from the upper black pixel (i.e., the fourth pixel from the bottom) in FIG. 8 does not strike the same objects as a ray originating from the immediately preceding pixel; that is, although a ray originating the immediately preceding pixel strikes object A and object B, a ray originating the upper black pixel does not strike object B though it strikes object A. Therefore, a strike judgment is performed for all objects that are expected to be relevant.

As for the shadow treatment, it is sufficient to recognize occurrence of a strike. Subsequent operations can be omitted at a time point when a strike is found. Therefore, in calculations for a very large number of pixels, the process can be stopped at a time point when a strike on a particular object is detected. This makes it possible to reduce the amount of calculation, which is relatively large, of strike judgments for an indefinite number of objects.

Similar operations are performed for reflection rays and refraction rays.

In performing a shadow generating operation, calculations, the DDA 3 may operate in such a manner as to perform calculations for second and preceding rays and omit calculations for third and following rays for a reflection ray and a refraction ray that are irrelevant to the shadow calculation, and perform calculations to third and preceding rays for a shadow ray (shadow calculation).

There may occur a case that reflection or refraction occurs repetitively between the same two objects. For such reflection or reflection, the image quality is not improved to a large extent even if calculations for third and following rays are performed. It is therefore preferable to omit such calculations. For example, calculations for third and following rays influence the image quality in a case of rendering an image of a room in which mirrors are put on the walls. Practically, it is almost meaningless to perform calculations for third and following rays except for such a case.

However, in the case of a shadow ray, whether a calculated second ray strikes a shadow object or an object that is not a shadow and is illuminated with light greatly influences the value of the second ray. Therefore, for a shadow ray, to use a calculation result of a second ray as correctly as possible, it is preferable to perform calculations to a third ray. The amount of calculation for a shadow ray is smaller than that for a reflection ray or a refraction ray.

Returning to FIG. 6, after completion of the data calculation for the second ray at step S25, at step S26 the DDA 3 performs an operation of composing a final color of the position of the surface of the object at which the first ray struck first by blending a color due to ambient light that has been determined by using the second ray, texture, and a color of the object.

Figure 9:
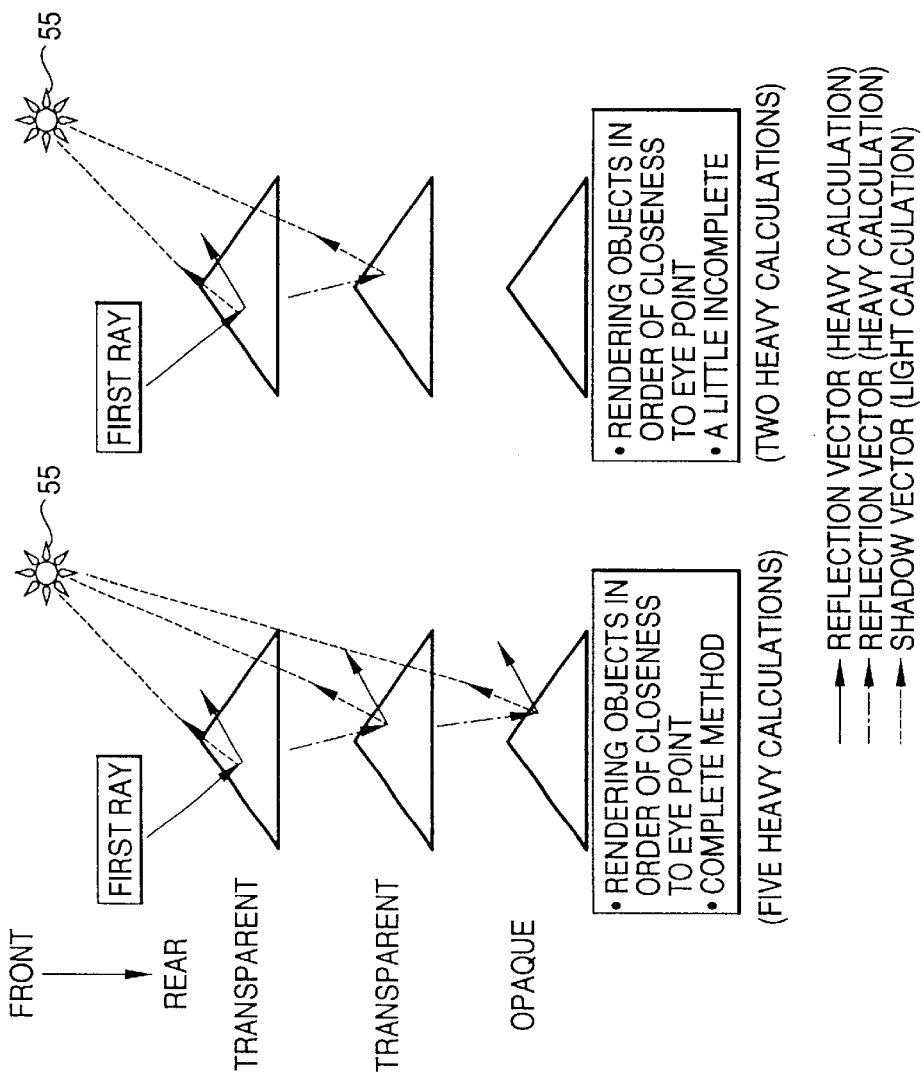
FIGS. 9(A)–9(C) illustrate an operation of rendering transparent objects.

As for rendering of transparent objects, if second ray calculations are performed while objects are rendered in order of their closeness to the eye point until reaching an opaque object as shown in FIG. 9(A), the color of the deepest object should also be seen through. However, in the case of FIG. 9(A), reflection vector and refraction vector calculations, which are heavy calculations, need to be performed five times.

In reflection ray and the refraction ray calculations, it is necessary to calculate a reflection direction and refraction direction by performing a calculation including an eye vector and a normal vector of an object surface at a reference point, performing strike judgments for all objects that are expected to be relevant by generating rays from the reference point in respective directions, and determine the object that is closest to the reference point. As such, this is a very heavy operation.

In contrast, a shadow ray calculation requires only a judgment of whether an object exists between a reference point and a light source; it is judged whether an object exists on the line segment between the reference point and the light source. The operation can be stopped at a time point when a strike is found first. Therefore, a shadow ray calculation is lighter than reflection ray and refraction ray calculations.

In view of the above, only transparent objects may be rendered in order of their closeness to the eye point as shown in FIG. 9(B). In this case, all heavy calculations are one reflection vector calculation and one refraction vector calculation and hence the amount of calculation can be reduced. However, this type of operation produces only an incomplete image.

As shown in FIG. 9(C), rendering that provides a certain level of transparency can be performed at a relatively high speed, though a resulting image is not correct, by rendering objects whose transparency is greater than a preset reference value (i.e., more transparent) in order of their distantness from the eye point while performing blending with the color of an already rendered pixel.

In this operation of rendering transparent objects, refraction ray calculations are omitted and only shadow ray and reflection ray calculations are performed. A refraction ray calculation requires judgments of whether a reflection ray strikes other objects and hence is much heavier than an α-blending calculation. Therefore, the processing speed can be increased by the difference between the amount of an α-blending calculation and that of a refraction ray calculation.

As described above, in this example, after a second ray calculation is stopped, while objects are rendered in order of their distantness from the eye point, color α-blending is performed by simply superimposing a transparent object thereon. This method enables correct rendering in a case where a transparent object is perpendicular to the eye line and hence a refraction ray is not bent; the error increases as the incident angle or the refraction angle increases. The error can be disregarded if the incident angle and the refraction angle are small.

In the method using the above-described α-blending, as the area of overlaps of transparent objects increases, the number of heavy calculations of this method approaches ½ of that of the complete method that is shown in FIG. 9(A) and the processing speed increases as much.

Figure 10:
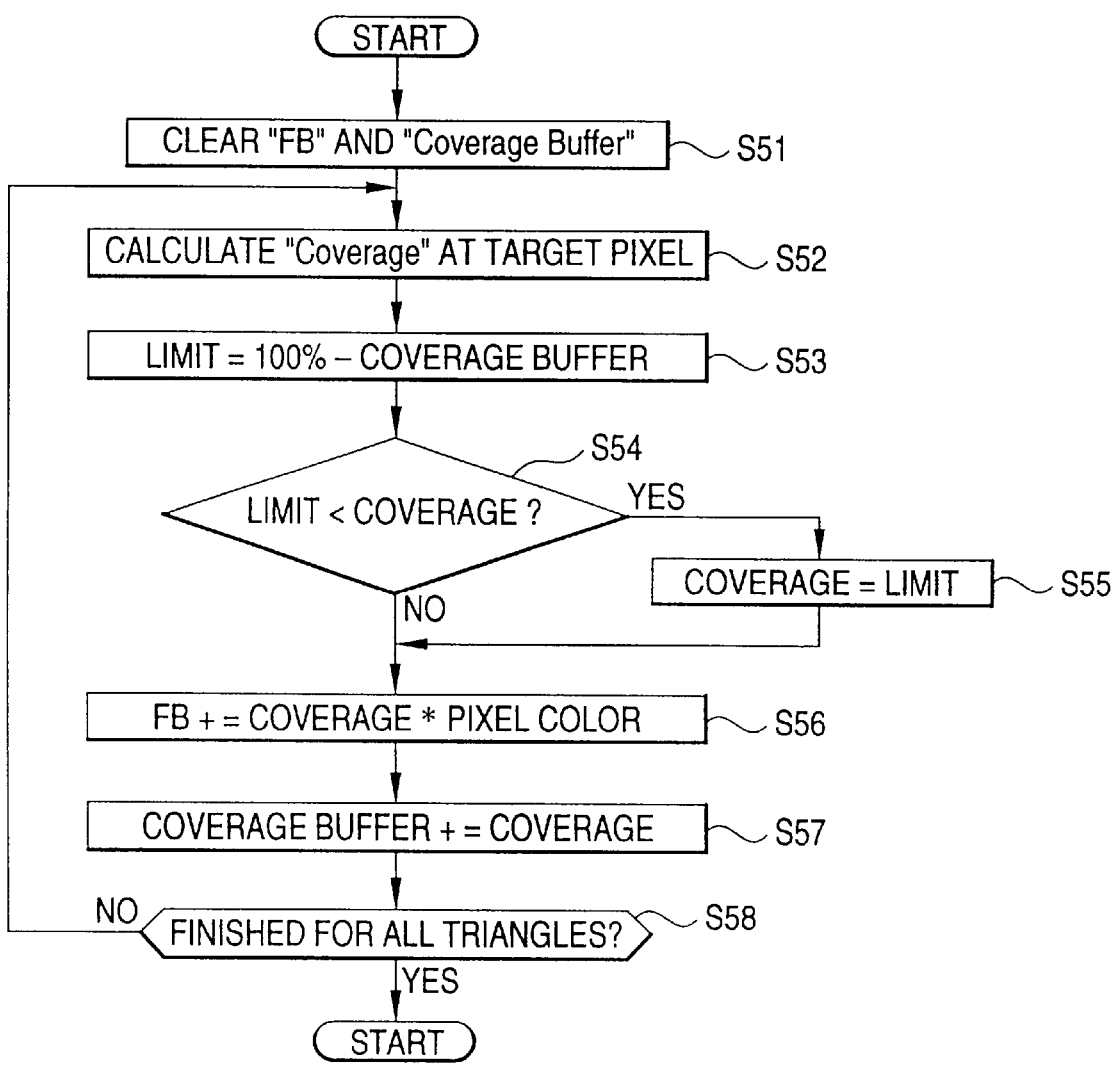
FIG. 10 is a flowchart showing an anti-aliasing process.

Returning to FIG. 6, a color composition operation is performed at step S26. At step S27, the DDA 3 writes a color that has been composed at step S26 onto the frame buffer 7. In doing so, the DDA 3 executes an anti-aliasing process. FIG. 10 is a flowchart showing details of this process.

Figure 11:
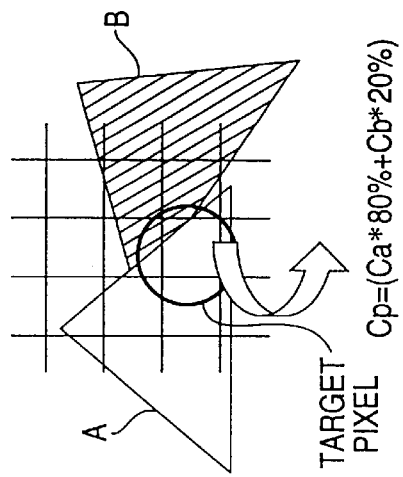
FIGS. 11(A)–11(C) illustrate the anti-aliasing process.
Figure 11:
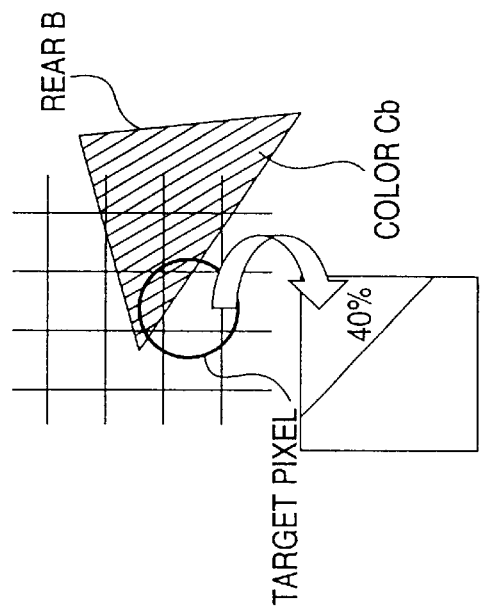
Figure 11:
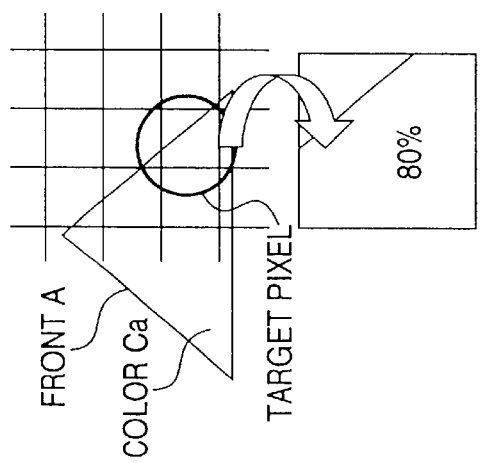

First, at step S51, the DDA 3 clears a stored value "FB" of the frame buffer 7 and a stored value "Coverage Buffer" of the coverage buffer 23. At step S52, the DDA 3 calculates a coverage "Coverage" of the target pixel. For example, as shown in FIG. 11(A), if triangle A that is closer to the eye point covers 80% of the area of the target pixel, "Coverage" amounts to 80.

Then, at step S53, the DDA 3 calculates the following equation:

Limit=100%−Coverage Buffer

At this time, since the value of "Coverage Buffer" was cleared to 0 at step S51, "Limit" is equal to 100.

Then, at step S54, it is judged whether the value of "Limit" that has been calculated at step S53 is smaller than the value of "Coverage" that was calculated at step S52. At this time, since "Limit" is 100 and "Coverage" is 80, the judgment result is "NO." Therefore, the process goes to step S56, where the DDA 3 multiplies the value of "Coverage" that was calculated at step S52 by a pixel color Ca of the subject triangle, outputs a multiplication result Ca×80% to the frame buffer 7 and stores it as a value "FB."

Then, at step S57, the DDA 3 adds the value of "Coverage" that was calculated at step S52 to the stored value "Coverage Buffer" of the coverage buffer 23. At this time, since the value of "Coverage Buffer" was cleared at the beginning, that is, at step S51, the value 80 that was calculated at step S52 is set as "Coverage Buffer."

Then, at step S58, it is judged whether all calculations for the triangles that overlap with the target pixel have finished. In the example of FIGS. 11(A)–11(C), since a rear triangle B also overlaps with the target pixel, the judgment result at step S58 is "NO" and hence the process returns to step S52.

At step S52, "Coverage" of triangle B with respect to the target pixel is calculated. Since the area of the target pixel that is covered by triangle B is 40%, "Coverage" is set at 40.

Then, at step S53, the equation

Limit=100%−Coverage Buffer is calculated. At this time, since "Coverage Buffer" was set at 80 at step S57, "Limit" is calculated as 20.

Then, at step S54, the values of "Limit" and "Coverage" are compared with each other. At this time, since "Limit" is 20 and "Coverage" is 40, the judgment result is "YES" and hence the process goes to step S55. At step S55, the DDA 3 sets "Coverage" to the value of "Limit." At this time, "Coverage" is set at 20.

Then, at step S56, the DDA 3 multiplies "Coverage" by a pixel color. At this time, since "Coverage" is 20% and the color of the target pixel is Cb, 20%×Cb is calculated. A calculated value is added to the value at the position of the target pixel in the frame buffer 7. Since the value 80%×Ca has already been stored in the frame buffer 7, in the end the color Cp of the target pixel is given by the following equation:

$$Cp=80\%\times Ca+20\%\times Cb$$

That is, as shown in FIG. 11(C), the color of the target pixel is determined by weighting the colors of triangles A and B in accordance with the areas of the target pixel that are covered by triangles A and B, respectively.

Then, at step S57, the value of "Coverage" that was calculated at step S52 is added to "Coverage Buffer." Since the value 80 is stored as "Coverage Buffer," the addition of 20 causes "Coverage Buffer" to have a value 100.

Then, at step S58, it is judged whether all pixels have been subjected to the weighting operation. If all pixels have been subjected to the weighting operation, the process is finished.

After the execution of the above weighting process, return is made to step S28 (see FIG. 6), where the CRTC 8 reads out image data that are stored in the frame buffer 7, converts those to a display signal, and outputs it to the display 9 and has it displayed thereon.

Figure 12:
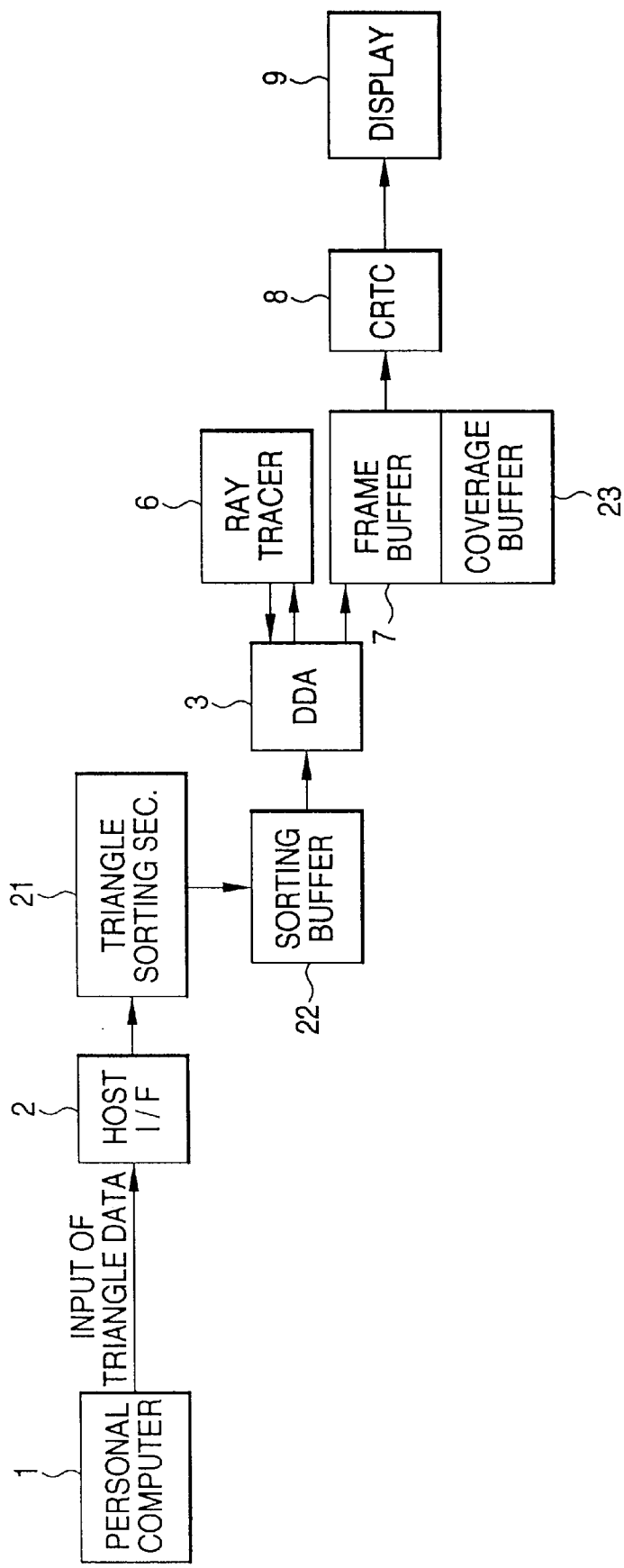
FIG. 12 is a block diagram showing the configuration of an image processing apparatus according to a third embodiment of the invention.

FIG. 12 shows the configuration of an image processing apparatus according to a third embodiment of the invention. This configuration is the same as the configuration of FIG. 5 except that the Z buffer 4 of FIG. 5 is omitted. That is, in this embodiment, the interpolation operation is performed without using the Z buffer 4.

Figure 13:
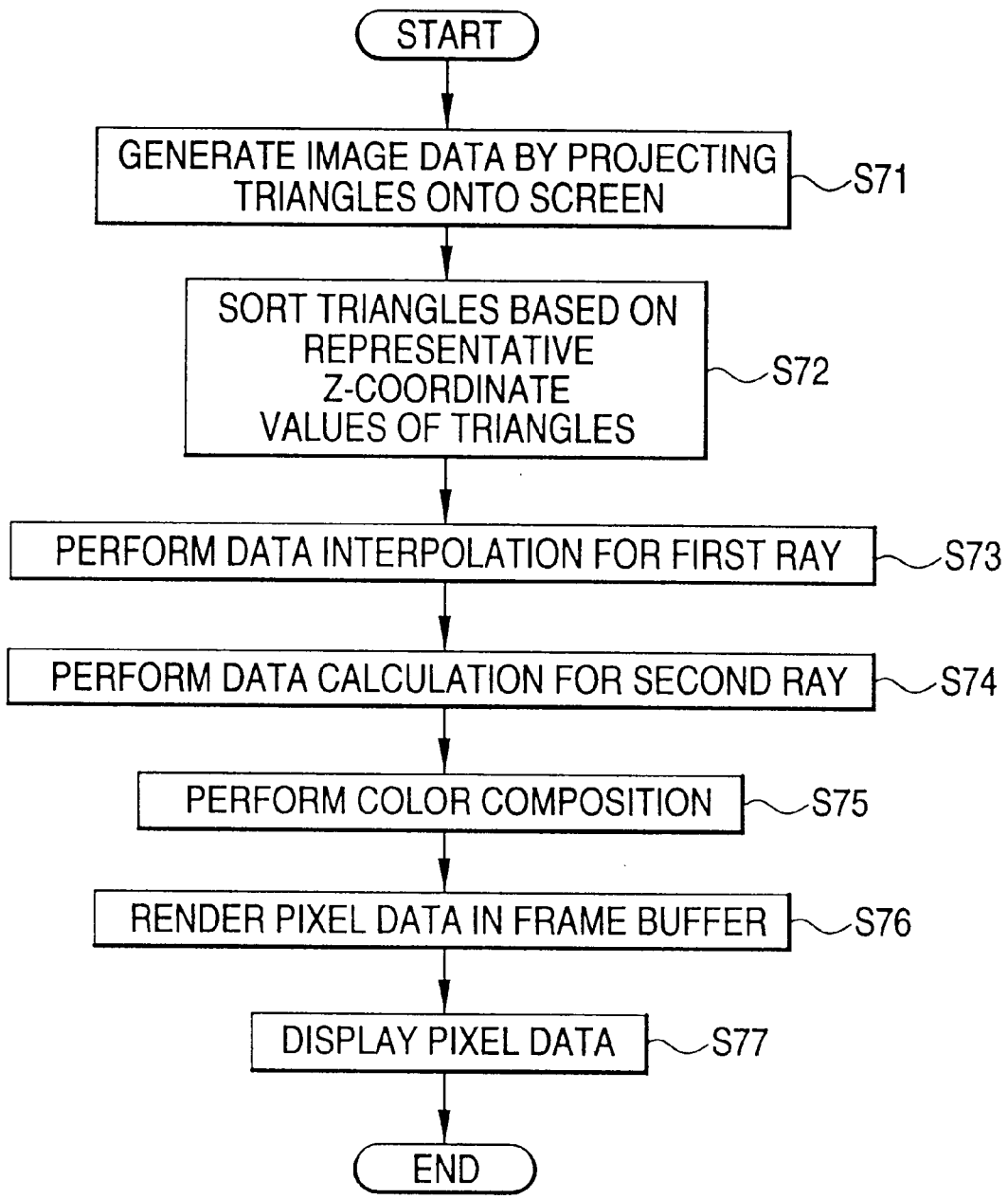
FIG. 13 is a flowchart showing a process to be executed by the image processing apparatus of FIG. 12.

FIG. 13 shows an example process to be executed by the image processing apparatus of FIG. 12. Steps S71–S77 are basically the same as steps S21–S23 and S25–S28 of FIG. 6 and step S24 of FIG. 6 (the judgment operation using the Z buffer 4) is omitted. While in the embodiment of FIG. 5 at step S23 the DDA 3 performs interpolation operations for triangles in order of their closeness to the eye point, in this embodiment at step S73 of FIG. 13, the DDA 3 performs interpolation operations for triangles in order of their distantness to the eye point. The other steps are the same as the corresponding steps shown in FIG. 6.

Even with the above process, image data can be obtained at high speed as a whole in a case where the area of overlaps of triangles is small, because the amount of calculation of the first ray is small in this case.

Figure 14:
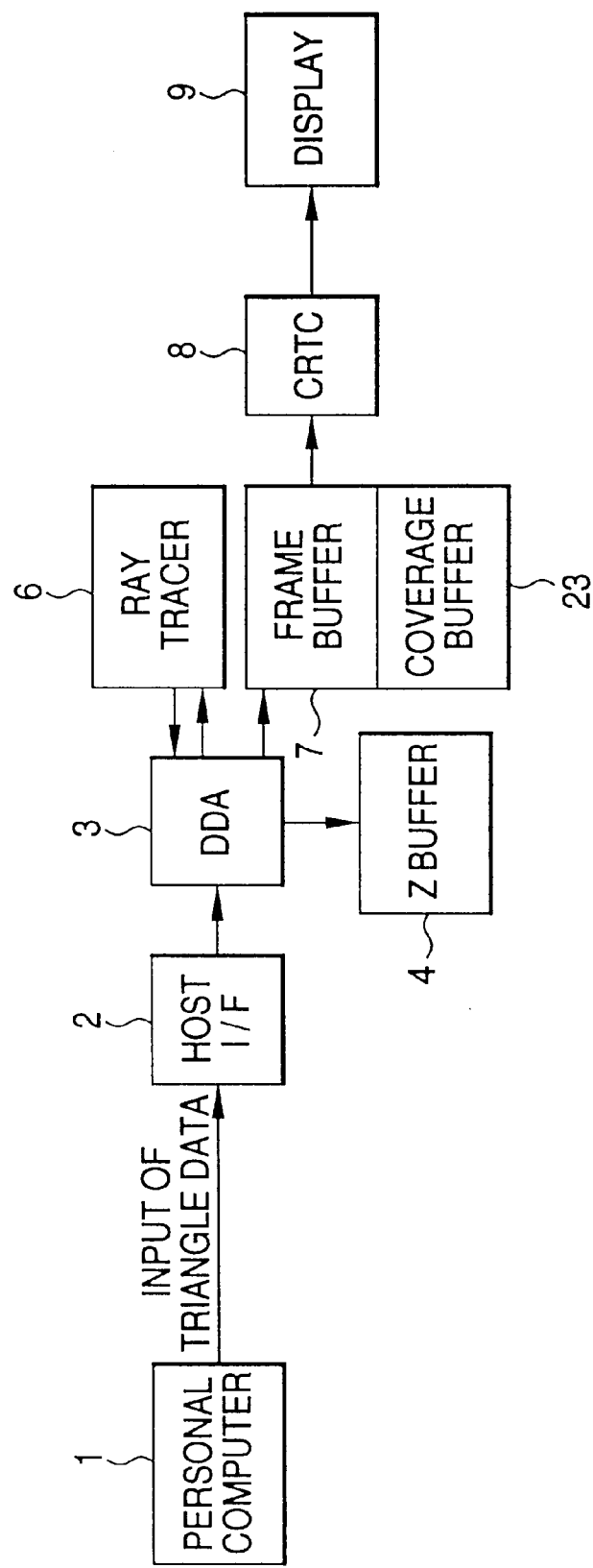
FIG. 14 is a block diagram showing the configuration of an image processing apparatus according to a fourth embodiment of the invention.

FIG. 14 shows the configuration of an image processing apparatus according to a fourth embodiment of the invention. This configuration is the same as the configuration of FIG. 5 except that the triangle sorting section 2 and the sorting buffer 3 of FIG. 5 are omitted.

Figure 15:
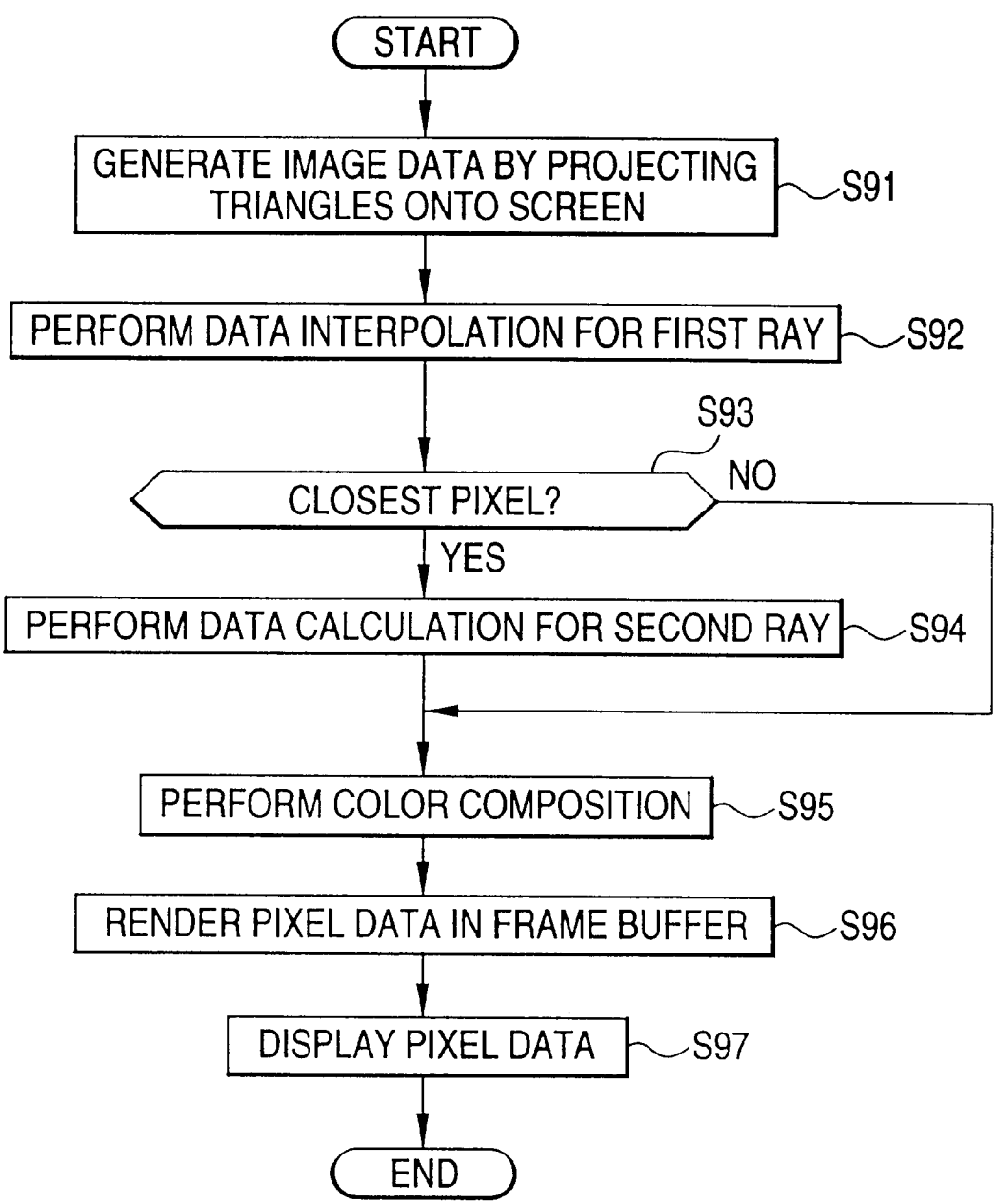
FIG. 15 is a flowchart showing a process to be executed by the image processing apparatus of FIG. 14.

FIG. 15 shows an example process to be executed by the image processing apparatus of FIG. 14. Steps S91–S97 are basically the same as steps S21 and S23–S28 of FIG. 6 and step S22 of FIG. 6 (the operation of sorting triangles based on their representative z-coordinate vales) is omitted.

That is, in this embodiment, at step S93, the operation of judging the relationship between pixels of respective triangles in the z-direction is performed by using stored values of the Z-buffer 4. First, as shown in FIG. 16(A), a white triangle A that is closer to the eye point is rendered in the frame buffer 7. Then, as shown in FIG. 16(B), when a black triangle B that is deeper than the white triangle A is rendered, calculations for second rays are not performed for the pixels of the closer triangle A that are indicated by white circles in FIG. 16(B). The other steps are the same as in the process of FIG. 6.

FIG. 16(C) shows a midway state of the rendering of the deeper triangle B that is being performed after the closer triangle A was rendered in the frame buffer 7.

In this specification, the term "system" means the entire apparatus that consists of a plurality of apparatuses.

Examples of providers that provide users with a computer program that enables execution of any of the above-described processes are recording media such as a magnetic disk, a CD-ROM, and a solid-state memory as well as communication media such as a network and a satellite.

As described above, according to the invention, since pixel data inside the surfaces of image data on a screen. coordinate system that are generated by projecting images of the surfaces of object in a three-dimensional coordinate space onto a screen are interpolated, image data can be generated more quickly.

What is claimed is:

1. An image processing apparatus which converts objects in a three-dimensional coordinate space to image data on a screen based on traditional ray tracing in which a first ray is traced from an eye point through a target pixel on a screen coordinate system to an object and the target pixel is subsequently corrected by calculating the influences of at least a second ray traced between the object and a second object independent of the eye point, said apparatus comprising:

substituting means for eliminating the need for the first ray tracing, the substituting means comprising projecting means for generating image data by projecting data representing surfaces of the object onto a screen coordinate system, and interpolating means for generating pixel data inside the surfaces on the screen coordinate system by interpolation based on the projected image data on the screen coordinate system; and correcting means for generating a ray for a point on the object that corresponds to the pixel data generated by the interpolating means, and for generating correction information for correcting a value of the pixel data on the screen coordinate system based on a judgment of intersection of the ray with another object.

2. The image processing apparatus according to claim 1, wherein the correcting means generates correction information for correcting color information of the pixel data.

3. The image processing apparatus according to claim 2, wherein the correcting means generates the correction information for correcting the color information of the pixel data based on ambient light in the three-dimensional coordinate space.

4. The image processing apparatus according to claim 1, wherein the interpolating means interpolates at least one of a light vector, a reflection vector, a refraction vector, a normal vector, and position coordinates in the three-dimensional coordinate space.

5. The image processing apparatus according to claim 1, further comprising storing means for storing pixel data that are closest to an eye point based on depth coordinates of the pixel data interpolated by the interpolating means, wherein the correcting means generates the correction information for the pixel data stored in the storing means.

6. The image processing apparatus according to claim 5, wherein the storing means comprises depth storing means for storing depth coordinates of the pixel data corrected by the correcting means, and data storing means for storing the pixel data that are closest to the eye point.

7. The image processing apparatus according to claim 5, wherein the correcting means generates the correction information for the pixel data stored in the storing means after pixel data of one picture have been stored in the storing means.

8. The image processing apparatus according to claim 1, wherein the interpolating means performs an interpolation operation on the data representing the surfaces in order of their closeness to an eye point.

9. The image processing apparatus according to claim 8, wherein every time each pixel data is interpolated by the interpolating means the correcting means corrects the pixel data just interpolated.

10. The image processing apparatus according to claim 9, wherein the interpolating means judges whether the pixel just interpolated is closest to the eye point, and, if the pixel just interpolated is judged closest to the eye point, the correcting operation of the pixel is carried out in the correcting means.

11. The image processing apparatus according to claim 9, wherein the interpolating means judges whether the pixel just interpolated is closest to the eye point, and, if the pixel just interpolated is judged not closest to the eye point, the correcting operation of the pixel is not carried out in the correcting means.

12. The image processing apparatus according to claim 8, further comprising sorting means for sorting the data representing the surfaces of the object based on depth coordinates that represent the surfaces of the object, wherein the interpolating means performs an interpolation operation on the data representing the surfaces in order of their closeness to the eye point as judged by the sorting means.

13. The image processing apparatus according to claim 8, wherein the interpolating means interpolates a reflection vector or a refraction vector at each pixel of the surfaces, and wherein the correcting operation of the pixel is not carried out if a value of the interpolated reflection vector or refraction vector at the pixel is smaller than a prescribed reference value.

14. The image processing apparatus according to claim 1, wherein if transparency of surfaces of object is greater than a prescribed reference value, the correcting means performs operations for higher order rays until a ray strikes the object whose transparency is smaller than the reference value.

15. The image processing apparatus according to claim 1, wherein if there exists a surface of an object that is closer to an eye point than a surface of a target object is, the interpolating means and the correcting means skip operations for the surface of the target object.

16. The image processing apparatus according to claim 1, wherein in a correcting operation for a shadow ray, a reflection ray, or a refraction ray, the correcting means first performs a judgment of a strike on the object that was struck by a ray originating from a pixel immediately preceding a pixel currently processed.

17. The image processing apparatus according to claim 16, wherein for second and following pixels in a span of the surface of the object, the correcting means first performs the judgment of a strike on the object that was struck by the ray originating from the pixel immediately preceding the pixel currently processed.

18. The image processing apparatus according to claim 16, wherein if the judgment of a strike on the object that was struck by the ray originating from the immediately preceding pixel produces a judgment result to the effect that a strike occurs, the correcting means does not perform subsequent intersection judgments in the correcting operation for a shadow ray, a reflection ray, or a refraction ray.

19. The image processing apparatus according to claim 1, wherein the correcting means performs a correcting operation for a shadow ray to a third ray and performs a correcting operation for a reflection ray or a refraction ray to a second ray, and wherein correcting operations using rays of the correcting means are started from a second ray.

20. The image processing apparatus according to claim 1, further comprising rendering means for determining color information of the pixel data based on correction values generated by the correcting means, and for recording the pixel data in a rendering buffer.

21. The image processing apparatus according to claim 20, wherein if transparency of surfaces of object is greater than a prescribed reference value, the rendering means blends a color of new pixels with a color of pixels that have already been rendered while rendering the pixel data in order of distance from an eye point.

22. The image processing apparatus according to claim 21, wherein the correcting means does not perform a correcting operation for a refraction ray.

23. The image processing apparatus according to claim 20, wherein if a plurality of objects correspond to one pixel, the rendering means weights the plurality of objects based on areas of the pixel covered by the respective objects.

24. The image processing apparatus according to claim 1, wherein the interpolating means interpolates pixel data in order of distance from an eye point in a depth direction of the screen coordinate system.

25. The image processing apparatus according to claim 1, wherein the data representing the surfaces of the object in the three-dimensional coordinate space are data representing triangles.

26. An image processing method for converting objects in a three-dimensional coordinate space to image data on a screen, said method based on traditional ray tracing in which a first ray is traced from an eye point through a target pixel on a screen coordinate system to an object and the target pixel is subsequently corrected by calculating the influences of at least a second ray traced between the object and a second object independent of the eye point, said method comprising:
   substituting the first ray tracing with projection and interpolation steps wherein the projection step comprises generating image data by projecting data representing surfaces of the object onto a screen coordinate system, and the interpolating step comprises generating pixel data inside the surfaces on the screen coordinate system by interpolation based on the projected image data on the screen coordinate system; and
   a correcting step of generating a ray for a point on the object that corresponds to the pixel data generated by the interpolating step, and for generating correction information for correcting a value of the pixel data on the screen coordinate system based on a judgment of intersection of the ray with another object.

27. The image processing method according to claim 26, wherein the correcting step generates correction information for correcting color information of the pixel data.

28. The image processing method according to claim 27, wherein the correcting step generates the correction information for correcting the color information of the pixel data based on ambient light in the three-dimensional coordinate space.

29. The image processing method according to claim 26, wherein the interpolating step interpolates at least one of a light vector, a reflection vector, a refraction vector, a normal vector, and position coordinates in the three-dimensional coordinate space.

30. The image processing method according to claim 26, further comprising a storing step of storing pixel data that are closest to an eye point based on depth coordinates of the pixel data interpolated by the interpolating step, wherein the correcting step generates the correction information for the pixel data stored by the storing step.

31. The image processing method according to claim 30, wherein the storing step comprises a depth storing step of storing depth coordinates of the pixel data corrected by the correcting step, and a data storing step of storing the pixel data that are closest to the eye point.

32. The image processing method according to claim 30, wherein the correcting step generates the correction information for the pixel data stored by the storing step after pixel data of one picture have been stored by the storing step.

33. The image processing method according to claim 26, wherein the interpolating step performs an interpolation operation on the data representing the surfaces in order of their closeness to an eye point.

34. The image processing method according to claim 33, wherein every time each pixel data is interpolated by the interpolating step the correcting step corrects the pixel data just interpolated.

35. The image processing method according to claim 34, wherein the interpolating step judges whether the pixel just interpolated is closest to the eye point, and, if the pixel just interpolated is judged closest to the eye point, the correcting operation of the pixel is carried out in the correcting step.

36. The image processing method according to claim 34, wherein the interpolating step judges whether the pixel just interpolated is closest to the eye point, and, if the pixel just interpolated is judged not closest to the eye point, the correcting operation of the pixel is not carried out in the correcting step.

37. The image processing method according to claim 33, further comprising a sorting step of sorting the data representing the surfaces of the object based on depth coordinates that represent the surfaces of the object, wherein the interpolating step performs an interpolation operation on the data representing the surfaces in order of their closeness to the eye point as judged by the sorting step.

38. The image processing method according to claim 33, wherein the interpolating step interpolates a reflection vector or a refraction vector at each pixel of the surfaces, and wherein the correcting operation is not carried out if a value of the interpolated reflection vector or refraction vector at the pixel is smaller than a prescribed reference value.

39. The image processing method according to claim 26, wherein if transparency of surfaces of object is greater than a prescribed reference value, the correcting step performs operations for higher order rays until a ray strikes the object whose transparency is smaller than the reference value.

40. The image processing method according to claim 26, wherein if there exists a surface of an object that is closer to an eye point than a surface of a target object is, the interpolating step and the correcting step skip operations for the surface of the target object.

41. The image processing method according to claim 26, wherein in a correcting operation for a shadow ray, a reflection ray, or a refraction ray, the correcting step first performs a judgment of a strike on the object that was struck by a ray originating from a pixel immediately preceding a pixel currently processed.

42. The image processing method according to claim 41, wherein for second and following pixels in a span of the surface of the object, the correcting step first performs the judgment of a strike on the object that was struck by the ray originating from the pixel immediately preceding the pixel currently processed.

43. The image processing method according to claim 41, wherein if the judgment of a strike on the object that was struck by the ray originating from the immediately preceding pixel produces a judgment result to the effect that a strike occurs, the correcting step does not perform subsequent intersection judgments in the correcting operation for a shadow ray, a reflection ray, or a refraction ray.

44. The image processing method according to claim 26, wherein the correcting step performs a correcting operation for a shadow ray to a third ray and performs a correcting operation for a reflection ray or a refraction ray to a second ray, and wherein correcting operations using rays of the correcting step are started from a second ray.

45. The image processing method according to claim 26, further comprising a rendering step of determining color information of the pixel data based on correction values generated by the correcting step, and for recording the pixel data in a rendering buffer.

46. The image processing method according to claim 45, wherein if transparency of surfaces of object is greater than a prescribed reference value, the rendering step blends a color of new pixels with a color of pixels that have already been rendered while rendering the pixel data in order of distance from an eye point.

47. The image processing method according to claim 46, wherein the correcting step does not perform a correcting operation for a refraction ray.

48. The image processing method according to claim 45, wherein if a plurality of objects correspond to one pixel, the rendering step weights the plurality of objects based on areas of the pixel covered by the respective objects.

49. The image processing method according to claim 26, wherein the interpolating step interpolates pixel data in order of distance from an eye point in a depth direction of the screen coordinate system.

50. The image processing method according to claim 26, wherein the data representing the surfaces of the object in the three-dimensional coordinate space are data representing triangles.

51. An information providing medium for providing a program that causes an image processing apparatus to execute a process of converting objects in a three-dimensional coordinate space to image data on a screen, said process based on traditional ray tracing in which a first ray is traced from an eye point through a target pixel on a screen coordinate system to an object and the target pixel is subsequently corrected by calculating the influences of at least a second ray traced between the object and a second object independent of the eye point, the process comprising:

substituting the first ray tracing with projection and interpolation steps wherein the projection step comprises generating image data by projecting data representing surfaces of the object onto a screen coordinate system; and the interpolating step comprises generating pixel data inside the surfaces on the screen coordinate system by interpolation based on the projected image data on the screen coordinate system; and a correcting step of generating a ray for a point on the object that corresponds to the pixel data generated by the interpolating step, and for generating correction information for correcting a value of the pixel data on the screen coordinate system based on a judgment of intersection of the ray with another object.

* * * * *